United States Patent
Patel et al.

(10) Patent No.: US 10,266,454 B2
(45) Date of Patent: Apr. 23, 2019

(54) COMPOSITION FOR ENHANCING THE PROPERTIES OF A SUBSTRATE AND METHOD FOR MAKING THE SAME

(71) Applicant: XO SCIENCE, LLC, Asheville, NC (US)

(72) Inventors: Vinay G. Patel, Kansas City, KS (US); Jeffrey L. Selph, Pace, FL (US)

(73) Assignee: XO Science, LLC, Asheville, NC (US)

( * ) Notice: Subject to any disclaimer, the term of this patent is extended or adjusted under 35 U.S.C. 154(b) by 0 days.

(21) Appl. No.: 15/541,109

(22) PCT Filed: Dec. 31, 2015

(86) PCT No.: PCT/US2015/068261
§ 371 (c)(1),
(2) Date: Jun. 30, 2017

(87) PCT Pub. No.: WO2016/109788
PCT Pub. Date: Jul. 7, 2016

(65) Prior Publication Data
US 2017/0362133 A1    Dec. 21, 2017

Related U.S. Application Data

(60) Provisional application No. 62/098,960, filed on Dec. 31, 2014.

(51) Int. Cl.
| | | |
|---|---|---|
| C04B 41/00 | (2006.01) | |
| C04B 41/50 | (2006.01) | |
| C08G 77/04 | (2006.01) | |
| C04B 41/45 | (2006.01) | |
| C04B 41/67 | (2006.01) | |
| C04B 28/02 | (2006.01) | |

(52) U.S. Cl.
CPC ........ *C04B 41/009* (2013.01); *C04B 41/4535* (2013.01); *C04B 41/5092* (2013.01); *C04B 41/67* (2013.01); *C08G 77/045* (2013.01); *C04B 28/02* (2013.01); *C04B 41/4549* (2013.01); *C04B 41/5072* (2013.01)

(58) Field of Classification Search
CPC ... C04B 41/009; C04B 41/5092; C04B 41/67; C04B 41/5072; C04B 41/4535; C04B 28/02; C04B 41/4549; C08G 77/045
See application file for complete search history.

(56) References Cited

U.S. PATENT DOCUMENTS

| | | | |
|---|---|---|---|
| 6,458,423 B1* | 10/2002 | Goodson | ................ B32B 13/00 106/690 |
| 6,783,799 B1* | 8/2004 | Goodson | ................ B32B 13/00 427/136 |
| 2002/0009622 A1 | 1/2002 | Goodson | |
| 2010/0022695 A1 | 1/2010 | Patel | |
| 2010/0083877 A1 | 4/2010 | Selph et al. | |
| 2013/0203916 A1 | 8/2013 | Patel | |

OTHER PUBLICATIONS

International Search Report and Written Opinion for PCT Application, PCT/US2015/055346, dated May 5, 2016, 8 pages.
Persia et al., "Performance of Nanocomposites for Conservation of Artistic Stones", 12th International Congress on the Deterioration and Conservation of Stone Columbia University, New York, 2012, 13 pages.

* cited by examiner

*Primary Examiner* — Joseph D Anthony
(74) *Attorney, Agent, or Firm* — Caseiro Burke LLC

(57) ABSTRACT

A surface treatment composition including polymeric complex nanoparticles used in a hydrophobic agent and siloxane complex nanoparticles used in a suspending agent thereof. The composition of the present invention is a solution comprising a plurality of components. The primary components are an acid mixture and a base mixture that are combined together in a manner to be described herein to produce a two-part liquid solution. The two parts, are combined together prior to application to a surface and allowed to cure on the surface.

11 Claims, No Drawings

US 10,266,454 B2

COMPOSITION FOR ENHANCING THE PROPERTIES OF A SUBSTRATE AND METHOD FOR MAKING THE SAME

BACKGROUND OF THE INVENTION

1. Field of the Invention

The present invention relates to compositions and methods for protecting surfaces. More particularly, the present invention relates to polymer-based surface finishing systems. The present invention provides an effective sealant for a range of substrates including, but not limited to, porous substrates such as cement.

2. Description of the Prior Art

There is a continuing need for coatings, treatments or finishes that protect surfaces against adverse environments. For example, protective coatings are needed for a range of substrates that may be economically effective substrates but that suffer from degradation as a result of exposure to the environment. Their effective service life can be severely limited by corrosion, fragmentation and the like due to rain, snow, ice and other environmental elements, including man-made elements that remain on the surface of the substrate and degrade it over time. For example, cement is a widely used substrate to provide a structural foundation for all sorts of purposes. Unfortunately, it can fail with catastrophic effect due to exposure to a range of conditions. It would be desirable to provide a surface treatment that can be used on otherwise desirable substrates including, but not limited to, cement.

Surface treatments, such as coatings, are often applied to substrates to protect the surfaces of such substrates from corrosive and otherwise degradative conditions. Some substrates are better than others at resisting degradation but they come at a high price. Other substrates are cost effect but more prone to degradation. It is desirable to use the lower cost materials for substrates while coating them with a surface treatment effective at remaining on the substrate and minimizing the adverse impact of environmental conditions. Typically, liquid coatings are used as protective coatings for many substrates, including non-metallic substrates such as cement. However, while existing liquid coatings can be applied effectively they suffer from a number of drawbacks, most notably the use of volatile organic compounds (VOCs) as solvents for their preparation and application. An increasing number of restrictions on VOCs has led to development of water-borne and high-solids coatings, the use of which has limitations due to long drying times, slow cure rates, less than complete surface coverage, particularly at the microscopic level, leading to inadequate weatherability.

Films and coatings comprising fluoro-containing polymers are known and their inertness toward moisture, many solvents, and weathering conditions is also known. For example, Teflon™ available from the DuPont Company is a poly(tetrafluoroethylene) compound that has found considerable use as a repellant for rain when incorporated into or spray-applied to clothing, upholstery, and other fabrics. However, fluoro-containing polymers are generally non-polar and do not easily adhere to many common surfaces such as wood, metals, cement and other polymers. In addition, fluoro-containing polymers generally are more expensive than their hydrocarbon polymer counterparts. Improved, cost-effective, strongly-adhering, long-lasting fluoro-containing polymer protective coatings are continually in demand.

Free-standing protective and/or decorative multi-layer films for outdoor use (e.g., outdoor signs, automobile bodies) are known. Typically, such films comprise an adhesive layer, a film layer that may optionally be pigmented, and an overlay or protective layer. Effective protective films must adhere strongly to the substrate and withstand challenges from heat, oxidants, solvents, sunlight, scratches, and impinging objects such as hailstones and rocks while maintaining their coverage integrity. However, such types of treatments are costly and require special attention to the application process. They also may be less than effective on relatively porous substrates, such as cement.

Therefore, what is needed is a composition that can be used as an effective surface protectant and/or as a surface enhancement, is relatively easy to apply and cost effective. The composition should not harm the surface to which it is applied and should provide complete coverage that minimizes porosity, which can expose the underlying substrate directly to environmental conditions. What is also needed is a method for making such a composition.

SUMMARY OF THE INVENTION

It is an object of the present invention to provide a composition that can be used as an effective surface protectant and/or as a surface enhancement, is relatively easy to apply and cost effective. The composition is formed to minimize or avoid harm to the surface to which it is applied. It is a further object of the invention to provide complete coverage with little to no gaps in coverage, even at a microscopic level, which gaps can expose the underlying substrate directly to environmental conditions. It is also an object of the invention to provide a method for making such a composition.

The present invention is a nanocoating composition that can be used to treat a surface of a substrate to protect that surface from environmental conditions including, but not limited to, water damage. The composition is applied to a relatively clean surface of the substrate, which substrate contains little to no existing corrosion in order to maximize the protective advantages of the composition when applied to the surface of the substrate. The composition is not made to bond to a corroded metal surface, it is not removable when bonded to the surface and there is no aspect of its usage that involves its removal in combination with removal of a corroded metal surface.

The composition of the present invention is a solution comprising a plurality of components. The primary components are an acid mixture and a base mixture that are combined together in a manner to be described herein to produce a two-part liquid solution. The two parts, are combined together prior to application to a surface and allowed to cure on the surface. Specifically, the composition is initially provided in liquid form that is applied, such as by spraying, to a surface to be protected. The surface must be as clean as possible without corroded material thereon. The sprayed composition initially forms a transparent layer that turns opaque upon curing. The composition is applied in at least two steps. A first layer is applied as a thin film that bonds to the surface of the substrate by integrating with microscopic interstices on the surface. The second layer is applied to and bonds to the first layer and is the layer of the coating that is exposed to the atmosphere upon curing. The combination of layers thereby protects the substrate. The composition is not applied or used so as to be removed from the surface of the substrate.

The composition includes polymeric nanoparticles and hydrogen hydroxide fused together to establish a polymeric nano fusion composition. In general, nanoparticles are those particles having at least one dimension that is less than 100 nanometers (nm). For purposes of the present invention, polymeric nanoparticles are approximately about 50 nm or smaller, but not specifically limited thereto. Instead, the polymeric nanoparticles of the present invention are any polymeric particles sufficiently small enough to fit within interstices, holes, valleys, etc. of a substrate having a surface to be finished. They may be in a range of about 15 nm to about 50 nm.

The solution composition of the present invention is formed by fusing together polymeric nanoparticles with hydrogen hydroxide (water) as a hydrogen-bond providing carrier and then encapsulating that fused combination in the manner to be described herein. Each component of the composition, working in concert with the others, provides a surface finish that is more easily and more quickly applied across a broad spectrum of environmental conditions. It is environmentally friendly, hard, more solid and deeper penetrating than conventional finishes. It remains functional to 400° C. and provides significantly greater protection from sun, soil, staining, static and friction than traditional finishes. It is suitable for use on a wide range of substrates including relatively nonporous substrates such as metals, and relatively porous substrates, such as cement The solution composition of the present invention can be used to mitigate static electricity through negative charging of the polymeric nanoparticles during the fabrication process and hydrogen fusion bonding of the particles. The nanoparticles are small enough to penetrate the surface and subsurface of the substrate to be treated to create a permanent bond by filling nano and micro pores on the top of and inside the surface.

The fusion bonded nanoparticles can flow into a surface forming an integral bond with the surface, minimizing the abrasive effect of wind, water or contact with other surfaces. When the water carrier evaporates, the polymer forms a superior, alloy like bond, isolating the surface, and requiring reapplication far less often. The nanometer-sized polymeric particles deliver superior penetration and isolation of most soft and hard surfaces, insulating against oxidation, providing superior protection from soiling, staining and ultra violet degradation. Subsequent applications of the composition are better suited to bond to previous applications of the composition and improve protection of the substrate. The finish reduces friction, repels dust, dirt and moisture, and inhibits oxidation, corrosion, pollution, static, fading and UV damage. The composition may be used to protect most any structure to which it is applied with little to no adverse impact on the environment.

These and other advantages of the present invention will become apparent upon review of the following detailed description, the accompanying drawing and the appended claims.

DETAILED DESCRIPTION OF THE INVENTION

A composition of the present invention for coating the surface of a substrate to protect that substrate from environmental conditions includes an Acid Mixture component, sometimes referred to herein as the Part A component, and a Base Mixture component, sometimes referred to herein as the Part B component.

Acid Mix.

The Acid Mixture component is formed of the following components: Monopotassium Phosphate (MKP), Titanium Dioxide ($TiO_2$), Hydrogen Hydroxide ($H_2O$ or water), Silicon Dioxide ($SiO_2$), Tripotassium Phosphate, also referred to as Potassium Phosphate Tribasic ($K_3PO_4$), Phosphoric Acid and a hydrophobic agent. The hydrophobic agent may be a Nano Siloxane Complex comprising nano particles in the size range of about 20 nanometers (nm) to about 50 nm. The hydrophobic agent may be selected from the group consisting of: Isobutyltrimethoxyisosilane, Isobutyltriethoxyisosilane, Triisobutylsilicateisosilane, Organofunctional Isobutyltrimethoxyisosilane, Organofunctional Isobutyltrimethoxyisosilane Hydroxy in cap; Alkoxytrisilicateisobutylisosilane, OrganofunctionalIsobutyltrimethoxyisosilane Hydroxy in cap; Alkoxytrisilicate Organofunctional Isobutyltrimethoxyisosilane Hydroxy in cap; Triethoxymethylpropanalcyclicsilane, Alkoxytrisilicate; Organofunctional Isobutyltrimethoxyisosilane Hydroxy in cap OH Reactive; and Ethyltrichlorosilane carbomethoxy. It is to be understood by those skilled in the art that "in cap" refers to hydroxyalkyl functional fluid polymerization that involves hydrolysable end caps, such as methoxy groups, wherein alkyl group components react with hydroxyl group components, resulting in end caps with methoxy groups.

Base Mix.

The Base Mixture component is formed of the following components: Magnesium Hydroxide (MgOH), A pozzolon material that is a silicate material used to enhance the physical properties of a cementitious material, the pozzolon selected from the group consisting of Metakaolin, which is a dehydroxylated form of the clay mineral kaolinite, Calcium Silicate ($CaSiO_3$), Aluminum Silicate ($AlSiO_3$) and Fly Ash; Nano Siloxane Complex, $K_3PO_4$, Hydrogen Hydroxide and a suspending agent. The suspending agent may be a Nano Polymer Complex comprising nano particles in the size range of about 15 nm to about 50 nm. The suspending agent may be selected from the group consisting of Polyvinyl polymeric chloride; Vinyl chloride polymer; Polyvinyl alcohol; Cellulose ether copolymer; Mono diglyceride polymer; Polyvinyl acrylic resin; Styrene monomers; Acrylic monomer; and Vinyl acrylic polymer.

The listed components make up the composition in the following ranges of proportions by volume:

Acid Mix=MKP (about 48% to about 72%), $TiO_2$ (about 0.4% to about 4.8%), $SiO_2$ (about 0.6% to about 4.3%), $K_3PO_4$ (about 4.5% to about 13.5%), Hydrogen Hydroxide (about 18% to about 39%) and hydrophobic agent (about 0.5% to about 20%).

Base Mix=MgOH (about 28% to about 52%), Pozzalon (about 12% to about 31%), CaSiO3 (about 14% to about 33%), Siloxane (about 0.4% to about 3.6%), $K_3PO_4$ (about 1.2% to about 4.2%), Hydrogen Hydroxide (about 24% to about 48%) and suspending agent (about 0.5% to about 20%).

The composition has been the subject of preliminary testing. The versions of the composition considered most promising include the following components in the indicated proportions by volume: PART-A: Water ($H_2O$): about 25% to 35%, MKP: about 60% to 65%, Phosphoric Acid: about 6% to 10%, a water soluble polymer such as cellulose ether, which is available from the Dow Chemical Company under the trade name Methocel™: 0.12% to 0.18%, $SiO_2$ 1% to 5%, TiO$_2$ 1% to 4%, Nano Polymer Complex-1% to 8% and Nano Siloxane Complex 1% to 8%. PART-B: Hydrogen Hydroxide: about 30% to about 40%, K$_3$PO$_4$: about 2% to about 8%, Cellulose ether: about 0.12% to about 0.18%, Metakaolin that has been pozzolanized; that is, enhanced to improve the characteristics of a cementitious material, with the suspending agent): about 18% to about 26%, MgOH: about 38% to about 44% and an alkyphenol such as Nonylphenol: about 0.01% to about 0.05%. One or more additives including, but not limited to, fiberglass, basalt and/or Aluminum, may be added to either or both of Part A or Part B of the composition to enhance bonding, crosslinking and/or to increase flexural strength of the composition. Such additives may be in a relatively small physical form such as in the form of microfibers or microparticles, for example.

Different variations of the inventive composition can be made by changing proportions of the listed components but the process of combining them is generally the same for those variations. The primary common steps of the composition fabrication process include:

Part-A Mix:
1—Mix the cellulose ether with Hydrogen Hydroxide for 10 to 12 minutes at room temperature.
Allow that mixture to rest for 10 to 12 minutes and then check viscosity (Ford cup), maintaining between 18 to 20 seconds.
2—Add Phosphoric Acid to the above mix. Mix for 10 to 12 minutes.
3—Add SiO$_2$ to the above mix. Mix for 5 to 7 minutes.
4—Add MgOH to the above mix. Mix for 5 to 7 minutes.
5—While mixing the mixture of step 4 above, add TiO$_2$.
6—Continue to mix and add Nano Polymer Complex.
7—Continue to mix and add Nano Siloxane Complex.
8—Continue mix for 10 to 12 minutes until the mixture becomes a creamy stable suspension.
9—Let the above mix stand for one hour and or let it cool to room temperature.
10—Optionally, retain batch sample.

Part-B Mix:
1—Mix K$_3$PO$_4$, with Hydrogen Hydroxide for 5 to 7 minutes. Let mix temperature drop back to 75 F to 80 F.
2—Continue to mix and add cellulose ether. Mix for 10 minutes. Let this mix rest for 10 minutes and then check viscosity (Ford cup), maintaining between 8 to 11 seconds.
3—While mixing the mixture of step 2 above, add pozzolanized Metakaolin. Mix for 5 minutes.
4—Start mixing and add MgOH. Mix for 10 minutes and allow that mixture to rest for 10 minutes. Maintain temperature below or less than 110 F to 115 F. Do not let this mix temperature climb over 120 F. Let this mix temperature cool down to less than 80 F.
5—While mixing the mixture of step 4 above, add alkylphenol. Mix for 5 minutes. Let mix set for one hour before filling containers.
6—Optionally, retain batch sample.

In all instances, proper quality control is maintained. For example, but not limited, all component amounts should be measured with suitable accuracy, contaminants are to be avoided, all components must be properly stored. All components should be premeasured, whether by weight or volume prior to mixing. All mixing must be done thoroughly and may be done with mechanical mixing, such as with a Hobart mixer, for example. Cross contamination and foreign particulate are to be avoided.

The mix ratio of Part A and Part B to form the composition of the present invention is about 1:1. When a user is ready to apply the composition to a substrate, Part A and Part B are individually stirred for at least three minutes and then mixed together at a ratio of about 1:1 ratio. The composition is initially provided in liquid form that is applied, such as by spraying, to the surface of a substrate to be protected. The surface must be as clean as possible without corroded material thereon. The sprayed composition initially forms a transparent layer that turns opaque upon curing. The composition is applied in at least two steps. A first layer is applied as a thin film that bonds to the surface of the substrate by integrating with microscopic interstices on the surface. The second layer is applied to and bonds to the first layer and is exposed to the atmosphere. The combination of layers thereby protects the substrate. The composition is not applied or used so as to be removed from the surface of the substrate.

Versions of the composition of the present invention were prepared and evaluated for usability and functionality as a protective coating for a surface. Samples of two examples of the composition were analyzed for handling, sprayability and response to test environments in testing performed by the independent Constructed Facilities Laboratory at North Carolina State University. The samples were applied to sandblasted mild steel plates by the laboratory for evaluation. White blasted 4"×4" steel plates were used as well as commercial blasted 3"×5" plates. The samples consisted of a "Part A" and a "Part B" that were mixed, evaluated, and sprayed on steel plates using a hand-held cartridge sprayer with static mixing nozzle. In general, the samples sprayed well, flowing through the nozzle without clogging and allowed for a thin-film coating to be deposited on the steel surface. The examples of the coating composition examined formed a hard surface within minutes of spraying. Prior to spraying, the samples were reacted (Part A mixed with Part B) in a small cup, and all hardened in less than 2 minutes with mixing. Certain samples did have notable deficiencies in spraying, however, no deficiencies were significant enough to prevent application or to render an application unusable.

In addition to spraying steel samples, a large-scale demonstration was conducted. A rusted steel beam having dimensions of approximately 14"×30"×16' was sandblasted to a commercial-grade finish. The beam was blown off with compressed air and was then sprayed with a thin coat of the samples. After coating the beam with a sample of the composition, the beam was then top-coated with a single layer of red enamel paint. A single layer of red topcoat was used, and during top coating, it was observed that the red paint covered the ceramic more easily than it covered bare steel. A single coat of red topcoat was used.

Salt tank drip testing was conducted on the samples. It was used to quickly evaluate the effectiveness of the coating of the present invention at protecting steel from corrosion. One coated steel plate from each sample was subjected to an intermittent stream of 5% Sodium Chloride (NaCl) solution (by mass). The intermittent stream was set on a timer to cycle 30 minutes on then 30 minutes off. Samples were compared visually before and after testing. Each sample was left in the test tank until substantial rusting of the steel sample was observed. All tested coupons were scratched to bare steel prior to testing in accordance with ASTM D1654. The specimens were angled at approximately 200 from the horizontal on a PVC support, allowing the stream of water to run down the scribe line of each specimen and flow off the bottom. The test was conducted in ambient laboratory conditions at a nominal temperature of 73° F. Tap water was added to the tank as needed to offset evaporation and to maintain a constant water level. Images were taken of each set of specimens at regular intervals. Prior to photographing, specimens were removed from the tank and rinsed with fresh water to remove surface debris and salt deposits. The plate coated with the composition of Example 1 described herein exhibited substantial rusting after 30 days. The plate coated with the composition of Example 2 described herein exhibited little rusting after 45 days.

Temperature resistivity of samples of coatings of the present invention were conducted to evaluate the ability of the coatings to sustain temperatures other than ambient. A 3×5 in. steel coupon was coated with the composition of Example 1 and was then placed in an oven at a constant temperature of 250° F. for 100 days. At the conclusion of the test, some surface map cracking was observed, but the ceramic coating remained visibly intact. A 3×5 in. steel coupon was also coated with the same composition, saturated with tap water and then placed in a freezer at 0° F. for 100 days. After 100 days, the coating remained well-bonded to the steel substrate, with a series of dark spots observed around the perimeter of the coupon. In addition, a 3×5 in. steel coupon that was coated with the composition of Example 1 was placed into a kiln for 19 days. The temperature in the kiln was gradually changed as follows: 350° F. for 5 days; then 550'F for 7 days; then 650° F. for 2 days; then 750° F. for 1 day; then 850° F. for 2 days; then 1000° F. for 1 day. The kiln was then shut off and allowed to cool back to ambient temperature over the period of 1 day. After this process, the coupon was scribed in accordance with ASTM D1654 and placed in the salt dripping tank described above. It was observed that map cracking appeared at 350° F., a brownish color developed beyond 350° F., and the brownish color darkened as the test progressed. Upon removal from the kiln, a coating was still present on the steel surface, however, it was significantly (but consistently) spotty in appearance. The kiln specimen was scribed per ASTM D1654 after removal from the kiln and placed in the salt drip tank. Even after sustaining 1000° F. in the kiln, the coating appeared to provide substantial protection of the steel surface against corrosion.

The salt dripping tests highlighted that the coating formed with the samples of the composition of the present invention was less soluble in fresh water than in salt water. To investigate the difference, the lower 2" of two ceramic-coated steel coupons coated with the Example 1 composition were immersed in freshwater or saltwater for 100 days. The lower 2" of each coupon was immersed. The coupon in fresh water was rust-stained (the back of the coupon was not coated), but the coating was otherwise intact. The coated portions of the freshwater specimen were well protected from corrosion (edges and back were not coated). The saltwater coupon was largely protected from corrosion (entire coupon was coated), however, much of the coating that was immersed in saltwater dissolved. Even in the dissolved area, however, the coupon was still mostly protected from corrosion, including along a scribe line.

Example 1—Composition Makeup (Proportions by Volume)

Part A:
Hydrogen Hydroxide: 23.27%
MKP: 64.5%
Phosphoric Acid: 8%
Methyl Cellulose: 0.13%
Nanotized SiO$_2$: 2%
Nano Siloxane Complex: 0.1%
Nanotized TiO$_2$: 2%

Part B:
Hydrogen Hydroxide: 34%
K$_3$PO$_4$: 3.8%
Methyl Cellulose: 0.1%
CaSiO$_3$: 21%
MgOH: 41%
pH stabilizer Nonylphenol: 0.1%

The components of Part A and Part B of Example 1 were mixed together in the manner described above. Parts A and B were then mixed together in the manner described above. The usability test results indicated that the pH was too low, the composition of Example 1 did not spray well and slight outgassing was produced with resultant uneven finish. The functionality test results for surface protection and temperature resistance are presented above.

Example 2—Composition Makeup (Proportions by Volume)

Part A:
Hydrogen Hydroxide: 22.54%
MKP: 64.5%
Phosphoric Acid: 8.5%
Methyl Cellulose: 0.16%
Nanotized SiO$_2$: 2.2%
Nano Siloxane Complex: 0.1%
Nanotized TiO$_2$: 2%

Part B:
Hydrogen Hydroxide: 31%
K$_3$PO$_4$: 4.4%
Methyl Cellulose: 0.12%
Metakaolin: 22%
MgOH: 41%
pH stabilizer Nonylphenol: 0.15%

The components of Part A and Part B of Example 2 were mixed together in the manner described above. Parts A and B were then mixed together in the manner described above. The usability test results indicated that the pH was satisfactory, the composition of Example 2 sprayed well with even distribution and a resultant smooth finish. The functionality test results indicated that surface protection was better for the Example 2 composition as compared to the example 1 composition, at least with respect to the salt drip test. It is believed that the Example 2 composition would be at least as effective as the Example 1 composition with respect to the other functionality testing conducted.

It was determined from the indicated initial testing that the composition of the present invention is suitable for conventional application by spraying, bonds well to the substrate and withstands environmental conditions with great protection of the substrate.

While the invention has been described with specific reference to particular components of the composition, certain versions representing specific combinations and the use of steps for making the composition, it is noted that the invention includes all reasonable equivalents.

What is claimed is:
1. A composition for protecting a surface of a substrate, the composition comprising a mixture of:
   a. an Acid Mixture component (proportions by volume) including Monopotassium Phosphate (about 48% to about 72%), TiO$_2$ (about 0.4% to about 4.8%), SiO$_2$ (about 0.6% to about 4.3%), K$_3$PO$_4$ (about 4.5% to about 13.5%), Hydrogen Hydroxide (about 18% to about 39%) and a Nano Siloxane Complex comprising nanoparticles thereof (about 0.5% to about 20%); and b. a Base Mixture component (proportions by volume) including Magnesium Hydroxide (about 28% to about 52%), Metakaolin (about 12% to about 31%), CaSiO3 (about 14% to about 33%), $K_3PO_4$ (about 1.2% to about 4.2%), Hydrogen Hydroxide (about 24% to about 48%) and a Nano Polymer Complex comprising nanoparticles thereof (about 0.5% to about 20%), wherein the Acid Mixture and the Base Mixture are mixed together in a ratio of about 1:1.

2. The composition as claimed in claim 1 wherein the Nano Siloxane Complex is selected from the group consisting of:

Isobutyltrimethoxyisosilane, Isobutyltriethoxyisosilane, Triisobutylsilicateisosilane, Organofunctional Isobutyltrimethoxyisosilane, Organofunctional Isobutyltrimethoxyisosilane Hydroxy, Alkoxytrisilicateisobutylisosilane, OrganofunctionalIsobutyltrimethoxyisosilane Hydroxy, Alkoxytrisilicate Organofunctional Isobutyltrimethoxyisosilane Hydroxy, Triethoxymethylpropanalcyclicsilane, Alkoxytrisilicate, Organofunctional Isobutyltrimethoxyisosilane Hydroxy and Ethyltrichlorosilane carbomethoxy.

3. The composition as claimed in claim 1 wherein the nanoparticles of the Nano Siloxane Complex are in the size range of about 15 nanometers to about 50 nanometers.

4. The composition as claimed in claim 1 wherein the Nano Polymer Complex is selected from the group consisting of: Polyvinyl polymeric chloride, Vinyl chloride polymer, Polyvinyl alcohol, Cellulose ether copolymer, Mono diglyceride polymer, Polyvinyl acrylic resin, Styrene monomers, Acrylic monomer, and Vinyl acrylic polymer.

5. The composition as claimed in claim 1 wherein the nanoparticles of the Nano Polymer Complex are in the size range of about 15 nanometers to about 50 nanometers.

6. The composition as claimed in claim 1 further comprising one or more additives.

7. The composition as claimed in claim 6 wherein the one or more additives are added to either or both of the Acid Mixture and the Base Mixture.

8. The composition as claimed in claim 6 wherein the one or more additives are selected from the group consisting of fiberglass, basalt and Aluminum.

9. A method of making a composition for protecting a surface of a substrate, the method comprising the steps of:

a. creating an Acid Mixture component (proportions by volume) including Monopotassium Phosphate (about 48% to about 72%), $TiO_2$ (about 0.4% to about 4.8%), $SiO_2$ (about 0.6% to about 4.3%), $K_3PO_4$ (about 4.5% to about 13.5%), Hydrogen Hydroxide (about 18% to about 39%) and a Nano Siloxane Complex comprising nanoparticles thereof (about 0.5% to about 20%);

b. creating a Base Mixture component (proportions by volume) including Magnesium Hydroxide (about 28% to about 52%), Metakaolin (about 12% to about 31%), CaSiO3 (about 14% to about 33%), $K_3PO_4$ (about 1.2% to about 4.2%), Hydrogen Hydroxide (about 24% to about 48%) and a Nano Polymer Complex comprising nanoparticles thereof (about 0.5% to about 20%); and c. combining together the Acid Mixture and the Base Mixture in a ratio of about 1:1.

10. The method as claimed in claim 9 wherein the step of combining includes the steps of stirring the Acid Mixture component and the Base Mixture component separately and then mixing the Acid Mixture and the Base Mixture together in a ratio of about 1:1.

11. A method of treating a surface of a substrate comprising the steps of:

a. cleaning the surface so as to eliminate the existence of corroded material thereon;

b. applying to the cleaned surface a first layer of a composition that includes a combination of an Acid Mixture and a Base Mixture in a mixture ratio of about 1:1; and c. applying to the first layer of the composition a second layer of the composition, wherein the Acid Mixture component (proportions by volume) includes Monopotassium Phosphate (about 48% to about 72%), $TiO_2$ (about 0.4% to about 4.8%), $SiO_2$ (about 0.6% to about 4.3%), $K_3PO_4$ (about 4.5% to about 13.5%), Hydrogen Hydroxide (about 18% to about 39%) and a Nano Siloxane Complex comprising nanoparticles thereof (about 0.5% to about 20%), and the Base Mixture component (proportions by volume) includes Magnesium Hydroxide (about 28% to about 52%), Metakaolin (about 12% to about 31%), CaSiO3 (about 14% to about 33%), $K_3PO_4$ (about 1.2% to about 4.2%), Hydrogen Hydroxide (about 24% to about 48%) and a Nano Polymer Complex comprising nanoparticles thereof (about 0.5% to about 20%).

* * * * *